United States Patent
Mortensen et al.

(10) Patent No.: US 11,652,422 B2
(45) Date of Patent: May 16, 2023

(54) POWER ELECTRONIC DEVICE

(71) Applicant: Danfoss Power Electronics A/S, Grasten (DK)

(72) Inventors: Henning Markus Mortensen, Skaerbaek (DK); Carsten R. Hansen, Broager (DK)

(73) Assignee: Danfoss Power Electronics A/S, Gråsten (DK)

( * ) Notice: Subject to any disclaimer, the term of this patent is extended or adjusted under 35 U.S.C. 154(b) by 373 days.

(21) Appl. No.: 16/451,211

(22) Filed: Jun. 25, 2019

(65) Prior Publication Data

US 2020/0014309 A1  Jan. 9, 2020

(30) Foreign Application Priority Data

Jul. 3, 2018 (DE) .......................... 102018116032.1

(51) Int. Cl.
*H02M 5/458* (2006.01)
*H02M 1/32* (2007.01)

(52) U.S. Cl.
CPC ........... *H02M 5/4585* (2013.01); *H02M 1/32* (2013.01)

(58) Field of Classification Search
CPC ............................. H02M 5/4585; H02M 1/32
See application file for complete search history.

(56) References Cited

U.S. PATENT DOCUMENTS

| | | | | |
|---|---|---|---|---|
| 4,475,139 | A | * 10/1984 | Chadwick | H02J 3/1864 363/54 |
| 4,571,535 | A | * 2/1986 | Gyugyi | H02J 3/1864 361/91.8 |
| 4,831,487 | A | 5/1989 | Ruoss | |
| 2002/0070821 | A1 | * 6/2002 | Moller | H03H 1/0007 333/181 |
| 2014/0055116 | A1 | * 2/2014 | Hosini | H02J 3/24 323/304 |
| 2014/0168830 | A1 | * 6/2014 | Vangool | H01H 83/04 361/47 |
| 2016/0322809 | A1 | * 11/2016 | Wang | H03K 17/165 |
| 2016/0329701 | A1 | * 11/2016 | Bandel | H02H 9/042 |
| 2017/0110226 | A1 | * 4/2017 | Hirschmann | H01T 1/14 |
| 2017/0302165 | A1 | * 10/2017 | Marcinkiewicz | H02M 1/4216 |
| 2019/0214814 | A1 | * 7/2019 | Carty | H02H 5/00 |

FOREIGN PATENT DOCUMENTS

| | | | |
|---|---|---|---|
| CN | 101764525 A | 6/2010 | |
| CN | 103368161 A | 10/2013 | |
| DE | 9320030 U1 | 5/1995 | |
| EP | 0182590 A2 | 5/1986 | |
| EP | 2322788 A1 | * 5/2011 | ............. F02M 37/32 |

* cited by examiner

*Primary Examiner* — Adolf D Berhane
*Assistant Examiner* — Afework S Demisse
(74) *Attorney, Agent, or Firm* — McCormick, Paulding & Huber PLLC

(57) ABSTRACT

A power electronic device comprising a grid side (L1, L2, L3) connected to a capacitor bank (2) is described, the capacitor bank (2) being connected to ground via a switch. Such power electronic device should be used in different types of grid with low costs. To this end a varistor (5) is connected in parallel to the switch.

17 Claims, 1 Drawing Sheet

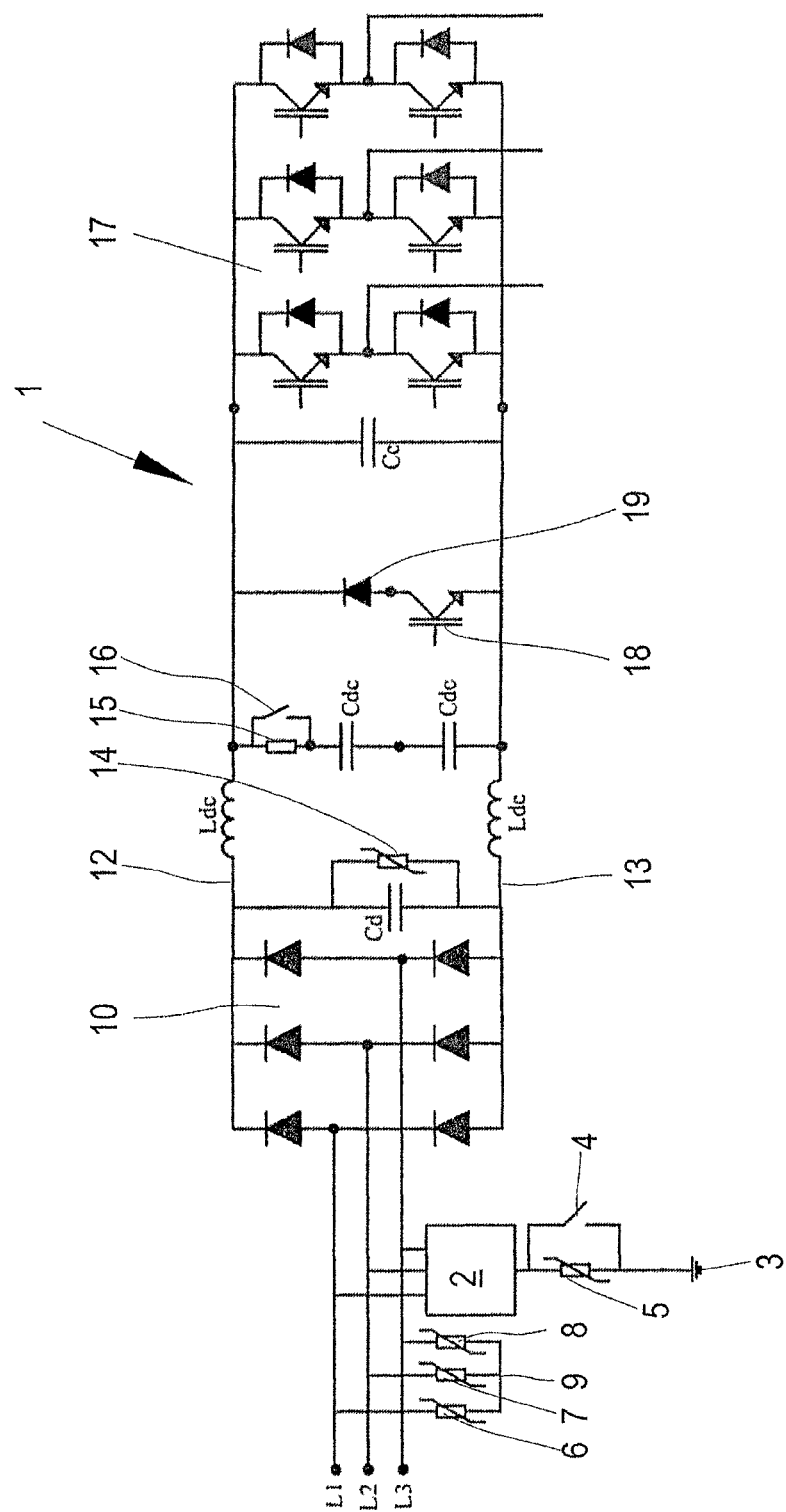

POWER ELECTRONIC DEVICE

CROSS-REFERENCE TO RELATED APPLICATION

This application claims foreign priority benefits under U.S.C. § 119 to German Patent Application No. DE 102018116032.1 filed on Jul. 3, 2018, the content of which is hereby incorporated by reference in its entirety.

TECHNICAL FIELD

The present invention relates to a power electronic device comprising a grid side connected to a capacitor bank, the capacitor bank being connected to ground via a switch.

BACKGROUND

The power electronic device can be, for example, in form of a frequency converter. A frequency converter comprises a rectifier stage, a DC-link and an inverter stage.

In any case, such a power electronic device shall be protected against surges from the grid. To this end it is known to use varistors as surge suppressors. As a minimum, protection against differential-mode surge voltages is necessary for the robustness of the power electronic device, i.e. against surge voltages between phases. Additional protection against common-mode surge voltages is needed, i.e. against surge voltages between a phase and ground.

It should be possible to use the power electronic device in different types of grids. One type of grid is a star-coupled grid and another type of grid is a delta-coupled grid. Other types of grids are possible.

The different types of grids require different surge voltage ratings. Most power electronic devices, like frequency converters, are specified to operate on any grid configuration. This requires, that the capacitor bank can withstand the highest surge voltage rating. This contributes to the costs of the power electronic device.

SUMMARY

The object underlying the invention is to have a power electronic device which can be used in different types of grids.

This object is solved with a power electronic device as described at the outset in that a varistor is connected in parallel to the switch.

The switch is used to adapt the power electronic device to different types of grids. When the power electronic device is fed by a grounded, star-coupled grid, the switch is closed. In this stage there is the lowest requirement for surge voltage rating. However, when the power electronic device is fed by a delta or IT grid, the switch is open. In this stage the capacitor bank is in series with the varistor, which increases the surge rating of the series connection to the full surge rating.

In an embodiment of the invention the varistor is a metal oxide varistor. A metal oxide varistor can be abbreviated with MOV. A metal oxide varistor has a rather steep characteristic starting from the operating voltage.

In an embodiment of the invention the varistor is dimensioned such that it becomes conductive before a voltage over the varistor exceeds an allowable voltage over the switch. Accordingly, a too high voltage over the switch can be avoided. Such an overvoltage over the switch would produce an electric arching with the risk that the switch is destroyed.

In an embodiment of the invention the varistor in the conducting state and the capacitor bank form a voltage divider, wherein the varistor limits a voltage over the capacitor bank to an allowable level. The varistor becomes conductive when a certain voltage is exceeded. However, the varistor still shows a resistance producing a certain voltage drop. Only the difference between the voltage drop and the surge voltage is applied to the capacitor bank. The capacitor bank can be dimensioned to a lower surge voltage rating.

In an embodiment of the invention the switch is a board mounted relay. Accordingly, the switch can be rather small having a correspondingly small distance between the contacts in open state. This is possible because the voltage over the switch can be limited by means of the varistor.

In an embodiment of the invention the capacitor bank comprises an arrangement of star coupled capacitors. Accordingly, the varistor is connected between a star point between the capacitors and ground.

In an embodiment of the invention differential mode varistors are connected between phases. These varistors are arranged at the input or grid side for differential-mode surge protection.

In an embodiment of the invention the switch is an electronically configurable relay. In this way it can be adapted to different configurations of the power electronic device.

In an embodiment of the invention the grid side is connected to a passive rectifier stage. The passive rectifier stage cannot be controlled so that it is not possible to use the passive rectifier stage as means for protection against surge.

In an embodiment of the invention the power electronic device is a frequency converter. A frequency converter comprises a rectification stage, a DC-link and an inverter stage. Such a frequency converter can operate on any grid configuration.

An embodiment of the invention will now be described in more detail with reference to the drawing, wherein:

BRIEF DESCRIPTION OF THE DRAWINGS

The only FIGURE shows a schematic circuit diagram of a power electronic device in form of a frequency converter.

DETAILED DESCRIPTION

A power electronic device in form of a frequency converter 1 comprises a grid side L1, L2, L3 which is connected to a capacitor bank 2. The capacitor bank 2 is connected to ground 3 via a switch 4. The capacitor bank comprises an arrangement of star coupled capacitor, more precisely a capacitance between each phase and a mid-point. The switch 4 is connected between the mid-point and ground 3. Each capacitance can be formed by a single capacitor or by a series or parallel connection of two or more capacitors.

A varistor 5 is connected in parallel to the switch 4. The varistor 5 is preferably in form of a metal oxide varistor.

The varistor 5 is an electronic component with an electrical resistance that varies with the applied voltage. At low voltage it has a high electrical resistance which decreases as the voltage is raised.

Accordingly, when a common-mode surge voltage appears, the varistor 5 becomes conductive.

The varistor 5 is dimensioned such that it becomes conductive before a voltage over the varistor exceeds an allowable voltage over the switch 4. Accordingly, the voltage over the switch can be limited to avoid an arching over the contacts of the switch.

In addition, the capacitor bank and the varistor in the conducting stage form a voltage divider. A certain voltage drop appears over the varistor 5. Thus, the capacitor bank 2 is not loaded by the full surge voltage, but only by the full surge voltage minus the voltage drop over the varistor 5. Thus, the voltage over the capacitor bank can be limited as well so that the risk of overloading the capacitor bank 2 is reduced.

The switch 4 can be a board mounter relay which can be electronically configurable, as it is described in US 2002/0070821 A1.

An arrangement of additional varistors 6, 7, 8 form a differential-mode surge protection. To this end the varistors 6, 7, 8 are connected between the phases and a common star point 9.

The grid side of the frequency converter 1 is connected to a passive rectification stage 10. The rectification stage is shown having a passive rectifier. However, it is possible to use an active rectifier as well. The rectification stage 10 is connected to a DC-link 11 having a positive rail 12 and a negative rail 13. A differential mode varistor 14 is connected between the positive rail 12 and the negative rail 13. This differential mode varistor 14 is connected in parallel to a capacitor Cd.

The DC-link furthermore may comprise two inductances Ldc, one in the positive rail 12 and one in the negative rail 13. DC-link capacitors Cdc maybe connected in series between the positive rail 12 and the negative rail 13. They can be connected in series with a resistor 15 which is bridged by an inrush relay 16. Other embodiments of a DC-link are possible.

The DC-link 11 is connected to an inverter stage 17 having a number of controlled switches, for example in form of semiconductor switches like IGBT or GTO. The input side of the inverter stage 17 is connected to a capacitance Cc.

Furthermore, a transistor 18 in series with a diode 19 can be connected between the positive rail 12 and the negative rail 13. However, these elements are optional.

When the frequency converter 1 is fed by a grounded, star-coupled grid having the lowest requirement for surge voltage rating, the switch 4 is closed. The capacitor bank 2 can be designed for a reduced surge rating.

When the frequency converter 1 is fed by a delta grid, the switch 4 is open. In this state, the capacitor bank 2 is in series with the varistor 5 which increases the surge rating of the series connection to the full surge rating. In addition, the series-connected varistor provides damping in the ground loop ensuring that a rated common-mode surge from the grid side L1, L2, L3 does not develop into even higher voltage level due to LC resonance.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A power electronic device comprising a grid side connected to a capacitor bank, the capacitor bank being connected to ground via a switch, wherein a varistor is connected in parallel to the switch, wherein the varistor is dimensioned such that it becomes conductive before a voltage over the varistor exceeds an allowable voltage over the switch and an allowable voltage over the capacitor bank.

2. The power electronic device according to claim 1, wherein the varistor is a metal oxide varistor.

3. The power electronic device according to claim 2, wherein the varistor in the conducting state and the capacitor bank form a voltage divider, wherein the varistor limits a voltage over the capacitor bank to an allowable level, and wherein the varistor is arranged in series with the capacitor bank.

4. The power electronic device according to claim 3, wherein the switch is a board mounted relay.

5. The power electronic device according to claim 2, wherein the switch is a board mounted relay.

6. The power electronic device according to claim 2, wherein the capacitor bank comprises an arrangement of star coupled capacitors.

7. The power electronic device according to claim 3, wherein the capacitor bank comprises an arrangement of star coupled capacitors.

8. The power electronic device according to claim 1, wherein the switch is a board mounted relay.

9. The power electronic device according to claim 8, wherein the capacitor bank comprises an arrangement of star coupled capacitors.

10. The power electronic device according to claim 1, wherein the capacitor bank comprises an arrangement of star coupled capacitors.

11. The power electronic device according to claim 1, wherein the switch is an electronically configurable relay.

12. The power electronic device according to claim 1, wherein the grid side is connected to a passive rectifier stage.

13. The power electronic device according to claim 1, wherein it is a frequency converter.

14. The power electronic device according to claim 1, wherein the varistor in the conducting state and the capacitor bank form a voltage divider, wherein the varistor limits a voltage over the capacitor bank to an allowable level.

15. The power electronic device according to claim 1, wherein differential mode varistors are connected between phases.

16. The power electronic device according to claim 15, wherein the differential mode varistors are connected between the phases and a common star point.

17. The power electronic device according to claim 15, wherein the differential mode varistors are arranged at the grid side.

* * * * *